United States Patent
Reh et al.

[11] Patent Number: 5,855,364
[45] Date of Patent: Jan. 5, 1999

[54] HYDRAULIC ANTIVIBRATION SUPPORT AND A MOTOR VEHICLE SUBASSEMBLY INCLUDING SUCH A SUPPORT

[75] Inventors: Denis Reh, Thiville; Patrick Philippeau, Chateaudun; André Girard, Mehun Sur Yevre, all of France

[73] Assignee: Hutchinson, Paris, France

[21] Appl. No.: 829,351

[22] Filed: Mar. 31, 1997

[30] Foreign Application Priority Data

Apr. 4, 1996 [FR] France .................................. 96 04251

[51] Int. Cl.⁶ ............... F16F 5/00; B60G 13/00; F16M 13/00

[52] U.S. Cl. ............... 267/140.13; 267/220; 248/562; 248/636

[58] Field of Search ................. 248/562, 636, 248/638, 634, 635; 267/140.11, 140.12, 140.13, 220

[56] References Cited

U.S. PATENT DOCUMENTS

| | | | |
|---|---|---|---|
| 4,262,886 | 4/1981 | Le Salver et al. | 267/8 R |
| 4,767,106 | 8/1988 | Le Fol | 267/140.1 |
| 4,781,361 | 11/1988 | Makibayashi et al. | 267/140.1 |
| 4,834,348 | 5/1989 | Jordens et al. | 267/140.1 |
| 4,856,750 | 8/1989 | Le Fol | 248/562 |
| 4,871,150 | 10/1989 | Le Salver et al. | 267/140.1 |
| 5,060,917 | 10/1991 | DuBos et al. | 267/140.1 |
| 5,556,071 | 9/1996 | Ballamy et al. | 248/634 |

FOREIGN PATENT DOCUMENTS

| | | |
|---|---|---|
| 0 012 638 | 6/1980 | European Pat. Off. . |
| 0 219 786 | 4/1987 | European Pat. Off. . |
| 0 236 199 | 9/1987 | European Pat. Off. . |
| 0 278 798 | 8/1988 | European Pat. Off. . |
| 0 287 455 | 10/1988 | European Pat. Off. . |
| 0 409 707 A1 | 1/1991 | European Pat. Off. . |
| 0 646 735 A1 | 4/1995 | European Pat. Off. . |
| 2 587 429 | 3/1987 | France . |
| 59-37348 A | 2/1984 | Japan . |
| 60-201136 A | 10/1985 | Japan .................. 267/140.13 |
| 61-130639 | 6/1986 | Japan .................. 267/140.13 |
| 61-165040 A | 7/1986 | Japan ...................... 248/636 |
| 61-205503 A | 9/1986 | Japan ...................... 267/220 |
| 5-16629 A | 1/1993 | Japan .................. 267/140.13 |

OTHER PUBLICATIONS

French Search Report dated Oct. 31, 1996, French Appl. No. FR 9604251.

*Primary Examiner*—Leslie A. Braun
*Assistant Examiner*—Michael Nornberg
*Attorney, Agent, or Firm*—Marshall, O'Toole, Gerstein, Murray & Borun

[57] ABSTRACT

A hydraulic antivibration support comprises an annular elastomer body surrounding a central axis and interconnecting a first support member and a support plate both of which are likewise annular. The elastomer body has two concentric annular cavities closed by the support plate, and constituting a working chamber and a compensation chamber which is radially defined on the outside by a thin side wall of the elastomer body, said two chambers being filled with liquid and being interconnected by a constricted passage which is defined in part by a channel-section piece located in one of the two chambers.

7 Claims, 1 Drawing Sheet

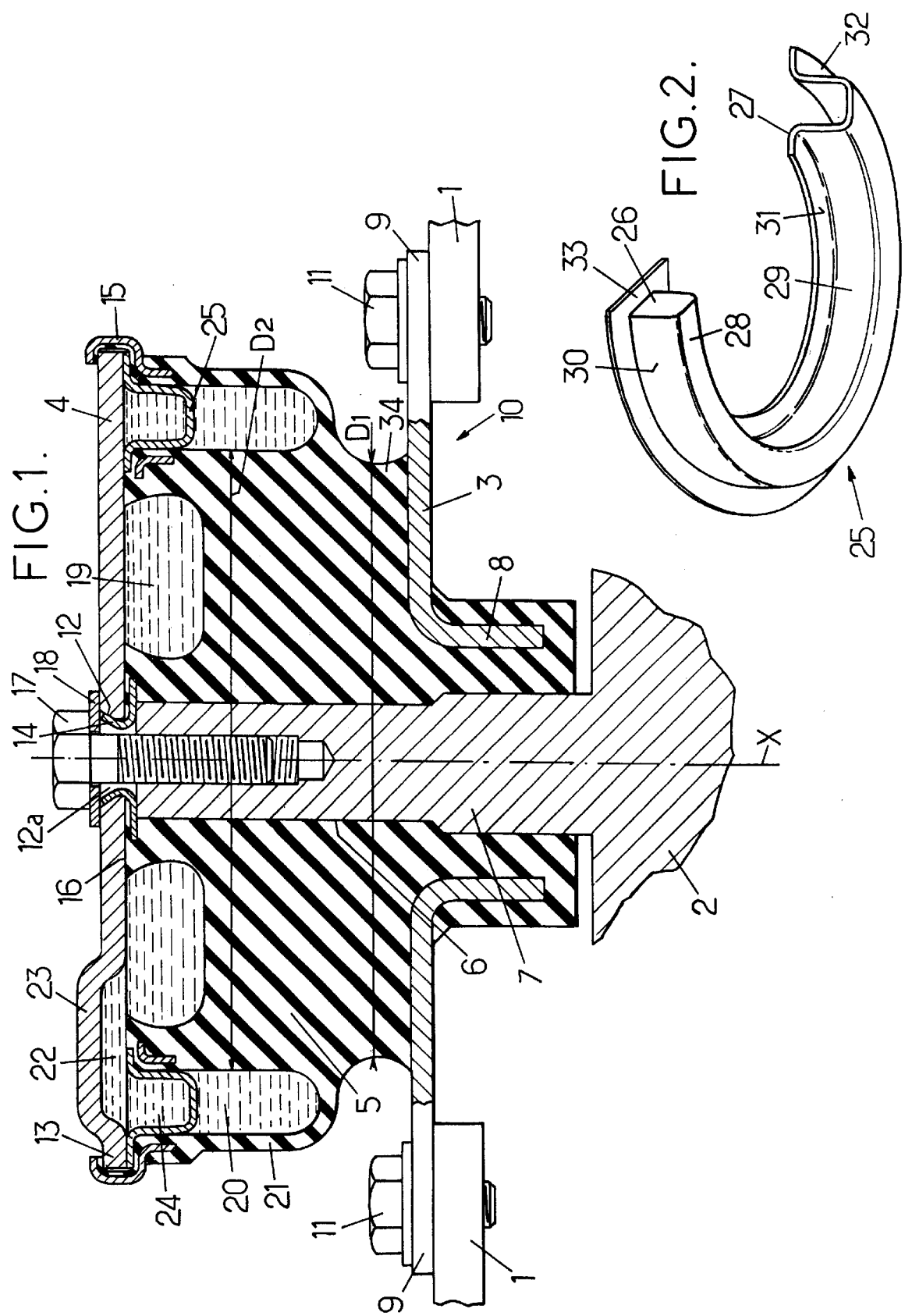

HYDRAULIC ANTIVIBRATION SUPPORT AND A MOTOR VEHICLE SUBASSEMBLY INCLUDING SUCH A SUPPORT

FIELD OF THE INVENTION

The present invention relates to hydraulic antivibration supports and to motor vehicle subassemblies including such supports.

In the field of such hydraulic antivibration supports, the invention relates more particularly to a hydraulic antivibration support for interposing between first and second rigid elements to link them together and to damp vibration parallel to a central axis, said support comprising an annular elastomer body surrounding the central axis and having a central well passing axially therethrough, said central well being designed to receive a rigid rod secured to the second rigid element, the elastomer body extending axially between first and second rigid support members each being annular in shape around the central axis, the first support member extending radially outwards to fastening portions suitable for fastening to the first rigid element, the second support member being a support plate which is substantially perpendicular to the central axis and which is in continuous contact with a bearing face belonging to the elastomer body, said support plate having a central hole disposed in register with the central well of the elastomer body and designed to enable the support plate to be fastened to the above-mentioned rigid rod, the elastomer body having cavities that open out into the bearing face, comprising firstly a working chamber that is deformable as a function of vibratory motion between the first and second support members, and secondly a compensation chamber formed in the vicinity of the side surface of the elastomer body so that said elastomer body presents a thin side wall constituting the radially outer wall of the compensation chamber, the working chamber and the compensation chamber thus being completely defined by the elastomer body and the support plate, said two chambers communicating with each other via a constricted passage, and the two chambers together with the constricted passage being filled with a liquid.

BACKGROUND OF THE INVENTION

An example of such a hydraulic antivibration support is given in document JP-A-59 037 348.

Nevertheless, the antivibration support disclosed in that document is relatively complex and expensive, and it is not always possible to make a constricted passage of desired length, it being understood that the vibration frequency at which the support provides optimum damping depends on said length.

OBJECTS AND SUMMARY OF THE INVENTION

A particular object of the present invention is to mitigate those drawbacks.

To this end, the invention provides an antivibration support of the kind in question, wherein the working and compensation chambers are both concentric annular cavities, being respectively an inner cavity and an outer cavity, an indentation being formed in the support plate facing the bearing face of the elastomer body to form a first channel extending radially from the working chamber to the compensation chamber, one of the two chambers containing a substantially channel-section piece extending longitudinally between first and second ends around an arc of a circle about the central axis, said channel-section piece having a solid bottom web interconnecting two solid side flanges, themselves extended respectively radially inwards and radially outwards by two continuous margins which are parallel to the support plate and which are clamped in sealing contact between the bearing face of the elastomer body and said support plate, the first end of the channel-section piece being closed, and the channel-section piece co-operating with the second support plate to define a second channel which communicates firstly via its second end with the chamber in which it is located, and secondly, between its first and second ends with the first channel, the first and second channels thus together forming the constricted passage.

By means of these dispositions, the antivibration support is made up of parts that are simple and few in number, such that the support is both easy to make and cheap.

Also, the length of the constricted passage can be selected easily as a function of requirements by selecting the length of the channel-section piece, or merely by selecting the angular position of said piece relative to the first channel.

In preferred embodiments, use is also made of one or more of the following dispositions:

the channel-section piece is contained in the compensation chamber;

the elastomer body is overmolded on the various annular metal elements, each of which is generally circularly symmetrical about the central axis, the elastomer body itself being substantially circularly symmetrical about said central axis;

the elastomer body has, between the compensation chamber and the first support member, a narrowed portion of outside diameter no greater than the inside diameter of the compensation chamber;

the elastomer body is overmolded on at least two annular metal strength members, firstly an inner strength member projecting into the central well of said elastomer body, and secondly an outer strength member projecting radially outwards from the body, said two strength members being crimped onto the support plate respectively via the central hole of said plate and via the outer periphery of said plate; and the first channel is constituted by a stamping formed in the support plate.

The invention also provides a subassembly for a motor vehicle including first and second rigid elements interconnected by a hydraulic antivibration support as defined above, the first rigid element being secured to the fastener portions of the first support member, said rigid element forming a passage through which there passes the rigid rod secured to the second rigid element, which rigid rod penetrates into the central well of the elastomer body and is fixed to the support plate.

BRIEF DESCRIPTION OF THE DRAWING

Other characteristics and advantages of the invention appear from the following detailed description of an embodiment thereof, given by way of non-limiting example and with reference to the accompanying drawing.

In the drawing:

FIG. 1 is an axial section view of a hydraulic antivibration support constituting an embodiment of the invention; and FIG. 2 is a perspective view of channel-section piece situated in the compensation chamber of the FIG. 1 antivibration support.

MORE DETAILED DESCRIPTION

In the description below, terms such as "up", "down", "top", and "bottom", are given purely by way of illustration and with reference to the most common position in which the hydraulic antivibration support of the invention is used, however these terms are not limiting in any way.

The hydraulic antivibration support shown in FIG. 1 is designed to be interposed between two rigid elements of a motor vehicle to interconnect the two elements while damping vibration motion that they may be performing along an axis X.

Specifically, the axis X can be vertical and the two rigid elements to be interconnected can be constituted, for example, by a portion 1 of the chassis of the vehicle and by a gearbox 2 which is to be suspended from this portion of the chassis by means of the antivibration support.

To this end, the antivibration support essentially comprises two rigid metal support plates 3 and 4 interconnected by an elastomer body 5 having an axial central well 6 passing therethrough: the bottom support plate 3 is fixed to the chassis 1 while the top support plate 4 is fixed to a rigid rod 7 that is received in the central well 6 and that is secured to the gearbox 2.

More precisely, the bottom support plate 3 is in the form of an annulus centered on the axis X, and it includes an inside edge that is folded axially downwards to form a short axial duct 8 embedded in the elastomer body and bonded thereto.

This axial duct 8 constitutes an abutment which restricts both the lateral displacement of the gearbox 2 and the upwards displacement thereof.

Going from said axial duct 8, the bottom support plate 3 extends radially outwards to a peripheral zone 9 (or where appropriate a plurality of outside tabs) projecting beyond the elastomer body and resting on the chassis 1 around a passage 10 formed through the chassis 1 to pass both the rigid rod 7 and the axial duct 8.

The peripheral zone 9 of the plate 3 is fixed to the chassis 1, in particular by screws 11 or by any other fastener means (nut-and-bolt assemblies, welding, etc. . . . ).

The top support plate 4 is also annular in shape, centered on the axis X, and it extends in a plane perpendicular to said axis X, radially between an inside edge 12 and an outside edge 13.

The inside edge 12 of the plate 4 defines a central orifice 12a centered on the axis X and having an inside diameter that is smaller than the inside diameter of the central well 6 through the elastomer body in the vicinity of the plate 4.

Also, the inside edge 12 is preferably chamfered so as to flare upwards.

The inside and outside edges 12 and 13 of the top support plate 4 have respective inside and outside annular metal strength members 14 and 15 crimped thereto, and partially embedded in the elastomer body, being bonded thereto: in this manner, the top plate 16 of the elastomer body is pressed in sealed manner against the bottom face of the top support plate 4.

The inside strength member 14 is preferably crimped against the chamfered inside edge 12 only of the top support plate so as to avoid projecting axially upwards from said support plate, thereby ensuring that the strength member 14 does not interfere with the fastening for the rigid rod 7 on the top support plate.

In the example shown, the fastening is provided by means of a screw 17 engaged in the rigid rod and having its head resting on a washer 18 in turn pressed against the top face of the plate 4, the rod 7 bearing against the bottom face of the strength member 14.

Finally, the elastomer body 5 which is a single molded piece, has two concentric annular cavities, firstly an inner cavity 19 which constitutes a working chamber, and secondly an outer cavity 20 which constitutes a compensation chamber and which is formed in the vicinity of the side surface of the elastomer body so that the radially outer wall of said compensation chamber 20 is defined by an elastomer wall 21 that is thin and easily deformable.

The two chambers 19 and 20 are interconnected by a constricted passage which comprises both a first channel 22 extending radially from one chamber to the other and formed by a stamping 23 formed locally in the top support plate 4, and by a second channel 24 which extends inside the compensation chamber 20 around a circular arc centered on the axis X.

This second channel 24 is defined by the top support plate 4 and by a metal section piece 25 which is disposed inside the compensation chamber 20.

As shown in greater detail in FIG. 2, the section piece 25 is substantially of channel section, and it extends longitudinally over a circular arc between a first end 26 which is closed by a solid wall, and a second end 27 which is open and which opens out into the compensation chamber 20.

The section piece 25 has a solid bottom web 28 situated in a plane parallel to the top support plate 4, and two solid side flanges 29 and 30 constituting respectively an inner flange and an outer flange, each extending from the web 28 to the bottom face of the plate 4.

The flanges 29 and 30 are extended respectively inwards and outwards by continuous folded-over margins 31 and 32 which lie in a common plane parallel to the plate 4 and which are clamped in sealed contact between the top face 16 of the elastomer body and the bottom face of the plate 4.

In addition, the two margins 31 and 32 are preferably interconnected by an end margin 33 at the first end 26 of the section piece, which end margin 33 is likewise pressed against the bottom face of the plate 4.

The first channel 22 communicates with the second channel 24 in the vicinity of the first end 26 of the channel-section piece 25, and the entire volume of the two chambers 19, 20, and of the two channels 22, 24 is filled with a liquid.

Thus, when relative axial vibration exists between the chassis 1 and the gearbox 2, the vibration causes the volume of the working chamber 19 to vary, thereby causing liquid to be transferred between said working chamber and the compensation chamber 20 via the constricted passage constituted by the first and second channels 22 and 24.

This damps said vibration, which damping becomes particularly effective in the vicinity of a "resonant" frequency depending on the section of the passage and on the length of the constricted passage as constituted by the first and second channels 22 and 24.

Between the compensation chamber 20 and the bottom support plate 3, it will be observed that the elastomer body preferably has a narrowed portion 34 with an outside diameter D1 smaller than the inside diameter D2 of the compensation chamber 20.

Thus, axial vibration imparted to the bottom and top support plates 3 and 4 does not disturb the operation of the compensation chamber 20.

It would also be observed that the elastomer body 5 is circularly symmetrical about the axis X as are the parts 3, 14, and 15 on which the body is overmolded, thereby greatly facilitating molding and ensuring that molding costs are kept low.

Where appropriate, the channel piece 25 could be contained inside the working chamber 19 instead of being situated inside the compensation chamber 20.

We claim:

1. A hydraulic antivibration support for interposing between first and second rigid elements to link them together and to damp vibration parallel to a central axis, said support comprising an annular elastomer body surrounding the central axis and having a central well passing axially therethrough, said central well being designed to receive a rigid rod secured to the second rigid element, the elastomer body extending axially between first and second rigid support members each being annular in shape around the central axis, the first support member extending radially outwards to fastening portions suitable for fastening to the first rigid element, the second support member being a support plate which is substantially perpendicular to the central axis and which is in continuous contact with a bearing face belonging to the elastomer body, said support plate having a central hole disposed in register with the central well of the elastomer body and designed to enable the support plate to be fastened to the above-mentioned rigid rod, the elastomer body having cavities that open out into the bearing face, comprising firstly a working chamber that is deformable as a function of vibratory motion between the first and second support members, and secondly a compensation chamber formed in the vicinity of the side surface of the elastomer body so that said elastomer body presents a thin side wall constituting the radially outer wall of the compensation chamber, the working chamber and the compensation chamber thus being completely defined by the elastomer body and the support plate, said two chambers communicating with each other via a constricted passage, and the two chambers together with the constricted passage being filled with a liquid, wherein the working and compensation chambers are both concentric annular cavities, being respectively an inner cavity and an outer cavity, an indentation being formed in the support plate facing the bearing face of the elastomer body to form a first channel extending radially from the working chamber to the compensation chamber, one of the two chambers containing a substantially channel-section piece extending longitudinally between first and second ends around an arc of a circle about the central axis, said channel-section piece having a solid bottom web interconnecting two solid side flanges, themselves extended respectively radially inwards and radially outwards by two continuous margins which are parallel to the support plate and which are clamped in sealing contact between the bearing face of the elastomer body and said support plate, the first end of the channel-section piece being closed, and the channel-section piece co-operating with the second support plate to define a second channel which communicates firstly via its second end with the chamber in which it is located, and secondly, between its first and second ends with the first channel, the first and second channels thus together forming the constricted passage.

2. A hydraulic antivibration support according to claim 1, in which the channel-section piece is contained in the compensation chamber.

3. A hydraulic antivibration support according to claim 1, in which the elastomer body is overmolded on the various annular metal elements, each of which is generally circularly symmetrical about the central axis, the elastomer body itself being substantially circularly symmetrical about said central axis.

4. A hydraulic antivibration support according to claim 1, in which the elastomer body has, between the compensation chamber and the first support member, a narrowed portion of outside diameter no greater than the inside diameter of the compensation chamber.

5. A hydraulic antivibration support according to claim 1, in which the elastomer body is overmolded on at least two annular metal strength members, firstly an inner strength member projecting into the central well of said elastomer body, and secondly an outer strength member projecting radially outwards from the body, said two strength members being crimped onto the support plate respectively via the central hole of said plate and via the outer periphery of said plate.

6. A hydraulic antivibration support according to claim 1, in which the first channel is constituted by a stamping formed in the support plate.

7. A subassembly for a motor vehicle including first and second rigid elements interconnected by a hydraulic antivibration support according to claim 1, the first rigid element being secured to the fastener portions of the first support member, said rigid element forming a passage through which there passes the rigid rod secured to the second rigid element, which rigid rod penetrates into the central well of the elastomer body and is fixed to the support plate.

* * * * *